United States Patent [19]
Hodges

[11] 3,939,310
[45] Feb. 17, 1976

[54] STEREOPHONIC HEADSET WITH EAR TO EAR ACOUSTICAL PASSAGEWAY

[76] Inventor: Robert B. Hodges, 1522 Jewell Ave., Topeka, Kans. 66607

[22] Filed: Aug. 9, 1974

[21] Appl. No.: 496,327

[52] U.S. Cl. ............................ 179/156 R; 179/1 GQ
[51] Int. Cl.² ...................... H04M 1/05; H04R 5/00
[58] Field of Search ............ 179/156 R, 1 GP, 1 GQ

[56] References Cited
UNITED STATES PATENTS

| | | | |
|---|---|---|---|
| 3,098,307 | 7/1963 | Caldwell | 179/156 R X |
| 3,863,028 | 1/1975 | Fixler | 179/1 GQ |
| R25,652 | 10/1964 | Kennedy | 179/1 GP |

*Primary Examiner*—William C. Cooper
*Attorney, Agent, or Firm*—Fishburn, Gold & Litman

[57] ABSTRACT

A stereophonic headset with an enclosed, ear to ear acoustical passageway is provided so that each of the wearer's and listener's ears can hear the output of both headset stereophonic speakers.

3 Claims, 5 Drawing Figures

STEREOPHONIC HEADSET WITH EAR TO EAR ACOUSTICAL PASSAGEWAY

BACKGROUND OF THE INVENTION

This invention relates to stereophonic headsets with an ear to ear acoustical passageway.

In the prior art, an old device was devised wherein a pair of spring connected ear pieces with no electrical activity were provided with a flexible tube running between the two ear pieces. The device was intended to be used by abutting one ear piece against a telephone receiver whereby extraneous sounds other than from the telephone receiver were shut out and the sounds were transmitted to the abutting ear piece and from the abutting ear piece to the other ear piece by means of the flexible tube. However, in this old device, the ear pieces had no electrical activity of any kind, to say nothing of not having stereophonic speakers as in the instant invention. Also, instead of having a substantially large acoustical passageway between the wearers' ears as the instant invention does, the passive ear piece merely used a relatively small diameter flexible tube.

Headsets have also been used wherein a tube connected both earphones and also passed in front of the wearer's mouth. The tube had a sound entrance opening in the tube in front of the wearer's mouth and the purpose of the tube is to convey sounds from the wearer's mouth to the wearer's ears so the wearer of the headset can hear himself talk.

The headset was not a stereophonic headset and instead of having a large acoustical passageway between the headset wearer's stereophonic speakers and ears a relatively small diameter tube with a mouth sound entrance opening was used. The purpose of the headset and tube was not to listen to stereophonic sounds, the purpose of the tube being merely to convey the wearer's speech to the wearer's ears.

To more fully appreciate the addition of this invention to the arts a brief discussion of stereophonic sound and this invention follows.

Stereophonic headsets existing today are alike in one important aspect. All transduce the electric signal from the left channel of a stereophonic sound recording or radio source to the left ear only, and the right channel to the right ear only, in the form of compressional sound waves. Although there is a pronounced stereo effect to the listener, that is, different sounds seem to come from different directions, the sound received by the listener is still not as realistic, when compared with the sound from a "live" program, as is possible with my invention.

An examination of how sound from a live program is received at the ears of a listener will make apparent the reason for the lack of realism in the prior apparatuses mentioned above. This invention overcomes the lack of realism and more closely approximates the effect of "live" sound at the ears of the listener. Upon hearing directional sound, that is, sound which is radiated from different distinct sources, the human brain "uses" three components of the sound received to deduce direction, distance and spatial quality. Those three components are (1) intensity differences between the sound at the two ears, (2) the phase difference of the sound wave compared between the two ears (the difference in time of arrival of a sound wave between the two ears) and (3) reflection-reverberation patterns due to the boundaries of the listening environment (all of which is familiar to those skilled in acoustic arts). As an example of a phase shift, at a frequency in the middle of the audible range, about 1,000 Hz, the wavelength of sound is about 13.5 inches. If a sound at this frequency arrives at a listener from directly in front of him, the wave arrives at both ears at the same time, in the same phase and with the same intensity, since the wave has traversed an equal distance to each ear. But if the wave originates from a direction 45° to the left of center, the wave will arrive at the left ear first, and after a slight bend around the head, it arrives at the right ear about one-half a wavelength later than the left ear, and therefore out of phase compared to the left ear. Due to the direct obstruction of the head in the wave front, the wave must spread around the head, causing both the phase lag and an intensity drop between the ears of the listener. At lower and higher frequencies, the same event occurs, but the phase lag and intensity drop for low frequencies are lessened due to the nature of the longer wavelength. At higher frequencies, the phase lag between the ears may be several frequency periods and the intensity drop quite considerable, due to the nature of the shorter wavelengths. In addition, the reflection of the sound off the walls or boundaries of the environment presents both ears of the listener with an additional complex and delayed system of waves in terms of intensity and phase relations. Due to the sensitivity of the ears and the capability of the brain, the listener deduces the intensity and phase differences of the initial transient sound waves in combination with reflection and reverberation to form an accurate mental cognition of the direction, distance and spatial quality of actual live sound.

It is obvious that all prior stereophonic headsets, due to the restriction of directing all the transduced sound from one sound radiator to one ear only, and all the sound from the other sound radiator to the other ear only, cannot simulate for the ears of the listener the quality of live, spatial sound, because the phase differences and reflection-reverberation patterns that are necessary are not present.

In contrast to prior headsets, my headset incorporates an acoustical passageway around the head, which allows the sound waves produced at one sound radiator to be heard not only by the ear adjacent to that sound radiator, but also by the other ear. For example, sound produced by the left sound radiator is first heard as a direct transient wave by the left ear. A portion of that sound wave also travels through the acoustical passageway in the headset around the head to the right ear, where it is heard comparatively out of phase and decreased in intensity. Sound from the right radiator, in a similar manner, is heard directly by the right ear, then by the left ear comparatively out of phase and decreased in intensity. Finally both ears hear sound that has been reflected randomly within the air space as reverberant sound. Therefore, a stereophonic program heard through the instant headset includes all three basic components necessary for distinguishing direction, distance and spatial quality as discussed previously, namely, intensity differences, phase differences, and reflection-reverberation patterns. Because of this, the listener hears sound from stereophonic recordings or stereophonic radio that more closely approximates the sound that would be heard listening to a live performance. This added realism adds much to the enjoyment of listening to stereophonic programs through the instant headset.

Thus, a problem solved by this invention is that the user experiences audiably a more realistic and, therefore, a more enjoyable stereophonic program than available to him with previous headsets.

SUMMARY OF THE INVENTION

A stereophonic headset with an enclosed, ear to ear acoustic passageway is provided so that each of the wearer's ears can hear the output of both headset stereophonic speakers.

DESCRIPTION OF THE PREFERRED EMBODIMENT

Figure 1:
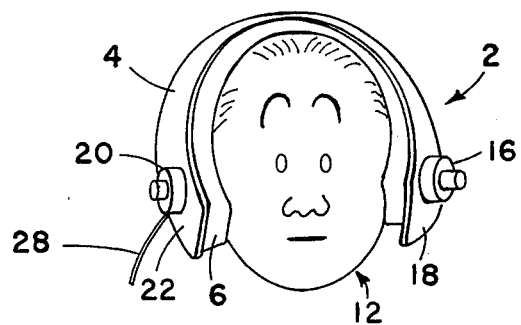
FIG. 1 is a front view of a stereophonic headset on a wearer's and listener's head.
Figure 2:
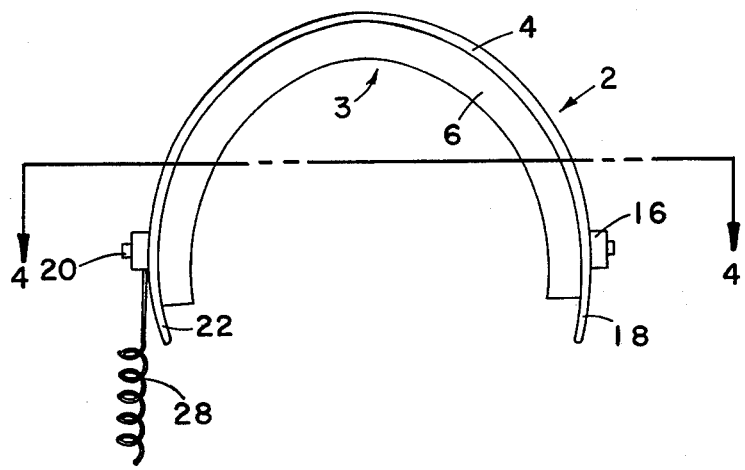
FIG. 2 is a front elevational view of the stereophonic headset.
Figure 3:
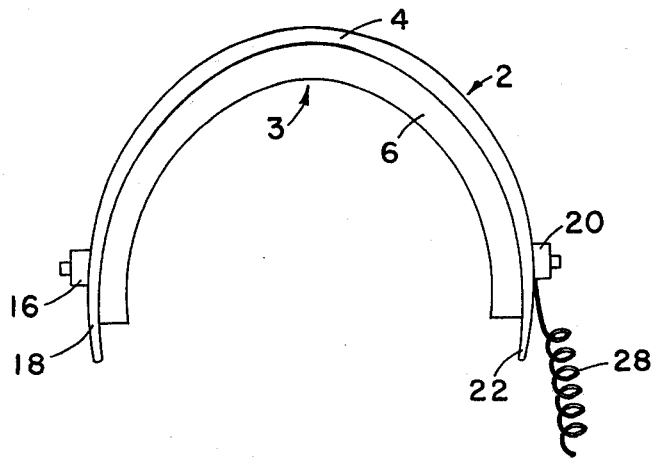
FIG. 3 is a rear elevational view of the stereophonic headset.
Figure 4:
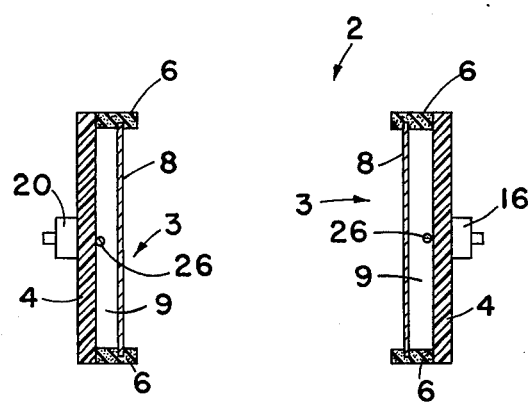
FIG. 4 is a sectional view taken along line 4—4 of FIG. 2.
Figure 5:
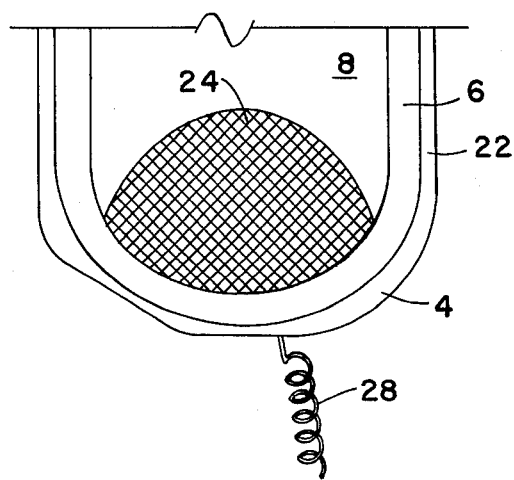
FIG. 5 is a partial side view, looking from the inside, of one side of the stereophonic headset.

Referring in greater detail to the drawings, a stereophonic headset 2 is shown. The stereophonic headset 2 has a headset member 3 comprised of a head member 4, a first acoustical passageway member 6 mounted to the head member 4 and a second acoustical passageway member 8 mounted to the first acoustical passageway member 6. The first acoustical passageway member 6 is mounted continuously on the inside of the head member 4 adjacent the head member 4 rim. The head member 4 is shaped to fit a wearer's head 12. The first acoustical passageway member 6 is made of a resilient material and adapted to continuously contact the wearer's head 12 when on the wearer's head 12. The second acoustical passageway member 8 is somewhat rigid but also somewhat flexible. As can be seen from the drawings, the head member 4, first acoustical passageway member 6 and second acoustical passageway member 8 combine to form an enclosed, ear to ear acoustical passageway 9. The acoustical passageway 9 is adapted to pass sound from each of the headset 2 wearer's ears to the other ear. The head member 4, first acoustical passageway member 6, and second acoustical passageway member 8 are preferably made of a substantially soundproof material and generally speaking the more soundproof they are, the better.

A right stereophonic speaker 20 is mounted in the head member 4 in the head member right portion 22 adjacent the wearer's right ear. A left stereophonic speaker 16 is mounted in the head member left portion 18 adjacent the wearer's left ear. The right stereophonic speaker 20 is adjacent the right termination of the acoustical passageway 9 and the left stereophonic speaker 16 is adjacent the left termination of the ear to ear acoustical passageway 9. A first wire screen 24 is mounted to the head member 4 to protect the right stereophonic speaker 20 and a second wire screen (not shown) is mounted to the head member 4 to protect the left stereophonic speaker 16. A first wire 26 connects the left stereophonic speaker 16 to the stereophonic audio signal input apparatus (not shown). A second wire 28 is shown that connects the right stereophonic speaker 20 and left stereophonic speaker 16 to the stereophonic audio signal input apparatus.

Now it can be seen that when the stereophonic headset is on the wearer's and listener's head 12 the audio signal input from the stereophonic apparatus goes to the right stereophonic speaker 20 and left stereophonic speaker 16. Because of the enclosed, ear to ear acoustical passageway 9 built into the stereophonic headset 2 the sound output from the right stereophonic speaker 20 can go to the wearer's left ear as well as the wearer's right ear and the sound output from the wearer's left stereophonic speaker 16 can go to the wearer's right ear as well as the wearer's left ear. Thus both of the wearer's ears can hear the output of both stereophonic speakers 16 and 20 for the purposes as set forth for increased stereophonic listening enjoyment of the headset 2 wearer and listener.

The invention in its broader aspects is not limited to the specific manufacture shown and described but departure may be made therefrom within the scope of the accompanying claims without departing from the spirit of the invention and without sacrificing its chief advantages.

I claim:

1. A sound reproducing headset comprising:
    a. a first and second earphone respectively adapted to produce sound from electrical signals, means supporting said earphones in generally opposed positions on the head of a listener and respectively in the vicinity of each of the listener's ears, and
    b. means forming an enclosed, acoustical passageway having openings only adjacent said respective ears, said earphones being directed into said passageway in the respective vicinity of said passageway openings,
    c. whereby the sound from said respective earphones intermixes in said passageway.

2. The headset as set forth in claim 1 including:
    a. insulation carried by said supporting means and cooperating therewith for blocking the entrance to said listener's ears of sound originating exteriorly of said headset.

3. The headset as set forth in claim 1 wherein:
    a. said passageway is smoothly curved between said passageway openings.

* * * * *